United States Patent Office 3,591,530
Patented July 6, 1971

3,591,530
PROCESS FOR THE PRODUCTION OF POLYMERS CONTAINING PHOSPHORUS AND NITROGEN
Urs Sollberger, Fullinsdorf, Basel, and Rainer Wolf, Allschwil, Basel, Switzerland, assignors to Sandoz Ltd. (also known as Sandoz AG), Basel, Switzerland
No Drawing. Filed Oct. 6, 1969, Ser. No. 864,201
Claims priority, application Switzerland, Oct. 16, 1968, 15,452/68; May 23, 1969, 7,878/69
Int. Cl. C08g 33/16
U.S. Cl. 260—2
8 Claims

ABSTRACT OF THE DISCLOSURE

Phosphorus- and nitrogen-containing polymers which are suitable as flame-proofing agents and are obtained by reacting phosphonitrilic halides, especially the chlorides, with organic compounds containing 2, 3 or 4 aliphatically bound hydroxy groups and optionally heating the reaction products with ammonia, a primary or secondary amine.

---

The production of polymers from phosphonitrilic chloride and aromatic di-or triphenols is known from French Pats. 1,281,571 and 1,508,933 and U.S. Pats. 2,866,773, 3,121,704, 3,299,001 and 3,313,774. Analogous reactions with aliphatic diamines [German patent application ("Auslegeschrift") 1,143,027], aromatic diamines (British Pat. 1,047,052) and glycols [J. Org. Chem. 31 (1966) p. 2004] have been described. The reaction products of phosphonitrilic chloride with difunctional hydroxy and amino compounds, owing to the high functionality of phosphonitrilic chloride, tend to cross-linking and hence are obtained as insoluble gels. Those products that are still soluble are described as substances of very low molecular weight, certain of them being oils. The reaction products of glycols and phosphonitrilic chloride in particular are stated to be insoluble.

It has now been found that polymers containing phosphorous and nitrogen which are solid and well soluble are obtained when 1 mole of a phosphonitrilic halide of formula $$\left[ P_mN_m \begin{matrix} -R_n \\ -(Hal)_{2m-n} \end{matrix} \right] \quad (I)$$

where

R stands for an organic radical,
Hal for chlorine, bromine or fluorine,
$m$ for a whole number from 3 to 12,
$n$ for a number from 0 to $m$, where $2m-n$ amounts to at least 4, Hal and R are bound to phosphorus atoms and at least 2 halogen atoms are bound to the same phosphorus atom, is reacted with $m/4$ to $m/2$ moles of a compound of formula $$\begin{matrix} HX & XH \\ & \diagdown \diagup \\ & R_1 \\ & \diagup \diagdown \\ HX & XH \end{matrix} \quad (II)$$

where

X stands for —O— or —NH—,
$R_1$ for one of the radicals

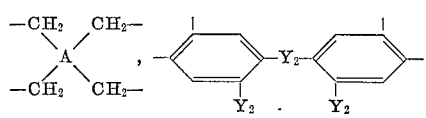

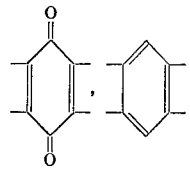

A for

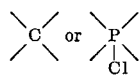

$Y_1$ for the direct linkage, —O—, —S—, $SO_2$, $$-CH_2- \text{ or } -\overset{\overset{\displaystyle CH_3}{|}}{\underset{\underset{\displaystyle CH_3}{|}}{C}}-$$

$Y_2$ in both instances for a hydrogen atom or the two $Y_2$ jointly for —S—, in which latter case $Y_1$ likewise stands for —S—,
or with $$\frac{2m-n}{8} \text{ to } \frac{2m-n}{2}$$

moles of an oxalkylated amine of formula $$\begin{matrix} R_2 \\ | \\ H-(O-CH-CH_2)_a \\ \diagdown \\ N-Z \\ \diagup \\ H-(O-CH-CH_2)_b \\ | \\ R_2 \end{matrix} \quad (III)$$

where $R_2$ stands for hydrogen or lower alkyl,
Z for a hydrocarbon radical which may bear hetero atoms or a radical of formula $$-(CH_2-\overset{\overset{\displaystyle R_2}{|}}{C}H-O)_c-H$$

or

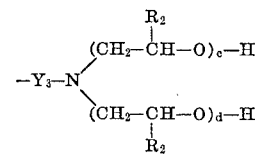

$Y_3$ for

or alkylene,
$v$ for a direct linkage, —O—, —S—, —SO—, —$SO_2$—,

or a straight or branched, saturated or unsaturated, optionally substituted hydrocarbon bridge with 1 to 6 carbon atoms between the benzene nuclei,
$a,b,c$, and $d$ for whole numbers from 1 to 10, and where alkylene contains 2 to 18 carbon atoms and preferably 2 to 6 carbon atoms and is straight or branched, saturated or unsaturated, substituted or unsubstituted, and the benzene nuclei may bear substituents.

The formation of solid and well soluble polymers by reaction of the aforedescribed phosphonitrilic halide compounds with the bi-, tri or tetra-functional hydroxy and amino compounds of formulae (II) and (III) was surprising. It can be explained by the coming into being of spirocyclic structural units, whereby the preferential formation of polymers with a linear chain structure takes place in spite of the high functionally of the reactants.

Phosphonitrilic chloride derivatives with a spirocyclic structure belonging to the low molecular-weight series are known; examples are the reaction products of phosphonitrilic chloride and pyrocatechin (cf. U.S. Pat. 3,294,872).

Suitable phosphonitrilic halides of Formula I include the reaction products of ammonium halides and phosphorus penta-halides, preferably the products of $NH_4Cl$ and $PCl_5$. Generally, the resulting mixtures or the isolated fractions thereof, e.g. $(P_3N_3Cl_6)$, $(P_4N_4Cl_8)$ or $(P_xN_xCl_{2x})$, in which $x$ is greater than 4 (cf. French Pat. 1,281,571, page 1) can be employed directly as they are. An example of a suitable mixture is 60–70% $(P_3N_3Cl_6)$, 10–15% $(P_4N_4Cl_8)$ and the remainder a mixture $(P_xN_xCl_{2x})$ where $x$ represents 5 to 12.

The organic radical R may be a hydrocarbon radical of the aliphatic, cycloaliphatic, aromatic or heterocyclic series which may be bound to the phosphorus atom through a hetero atom, such as oxygen, sulphur or preferably nitrogen, and may be substituted. Preferably the radical R is an aromatic radical of the benzene series, e.g. a phenyl or chlorophenyl radical, a heterocyclic radical, e.g. a piperidine radical bound through the nitrogen atom, or two adjacent R radicals may form together with P a benzophosphadiazole radical. The compounds of the following formulae may be enumerated as examples:

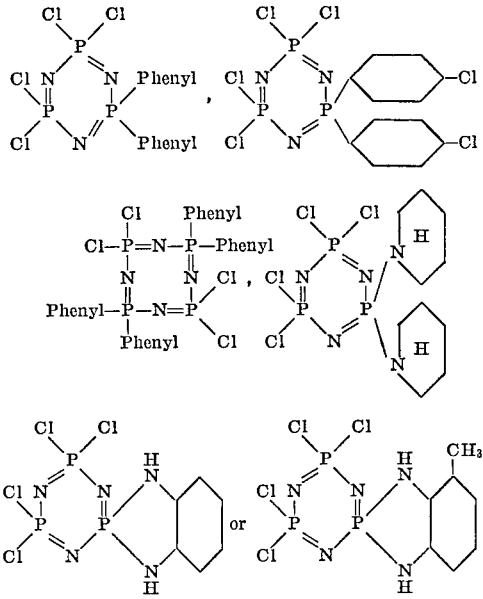

Noteworthy examples of compounds of Formula II are:

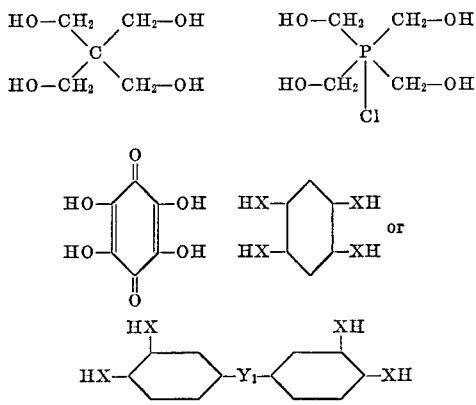

wherein each XH represents —OH or —NH₂ but in a given molecule the four XH need not have the same meanings, and $Y_1$ has one of the aforestated meanings; for example 1,2,4,5-tetrahydroxybenzene, 1,2,4,5 - tetra - aminobenzene, 2,5-diamino-1,4-dihydroxybenzene, 4,4'-diamino-3,3'-dihydroxy-1,1'-diphenyl, -1,1'-diphenyloxide, -1,1'-diphenylsulphide, -1,1'-diphenylsulphone, -1,1-diphenylmethane, 3,3',4,4'-tetra-amino-1,1'-diphenyl, -1,1'-diphenyloxide, -1,1' - diphenylsulphone, -1,1' - diphenylmethane, 3,3' - diamino - 4,4' - dihydroxy-1,1'-diphenyloxide, -1,1'-diphenylsulphide, -1,1'-diphenylsulphone, 1,1'-diphenylmethane, or a compound of formula

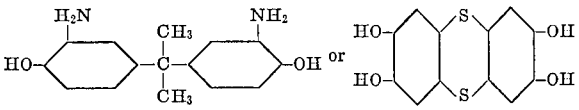

If the substituents Z in Formula III is a hydrocarbon radical it may be, for example, an aliphatic, optionally substituted radical having 1 to 22 carbon atoms (methyl, ethyl, isopropyl, n-butyl, n-amyl, n-hexyl, n-octyl, n-decyl, n-dodecyl, n-tetradecyl, cetyl, stearyl, arachinyl, behenyl, sec.octyl, 2-ethylhexyl, oxo-nonyl, oxo-decyl, oleyl, benzyl, phenylethyl), a cycloaliphatic radical (cyclohexyl, 4-methylcyclohexyl, cyclo-octyl) or an optionally substituted aromatic radical (phenyl, 2-, 3- or 4-methylphenyl, 3- or 4-chlorophenyl, 4-fluorophenyl, 4-bromophenyl, 2,4- or 2,5-dichlorophenyl, 2- or 4-methoxy- or -ethoxyphenyl, 4-ethylphenyl, 2,4- or 2,5-dimethylphenyl, naphthyl-1 or naphthyl-2).

In the compounds of Formula III, wherein Z is a hydrocarbon radical, the sum $a+b$ is advantageously about 2 to 8.

The radical $Y_3$ may be derived, for example, from one of the following diamines:

4,4'-diamino-1,1'-diphenyl, 4,4'-diamino-2,2'- or -3,3'--dimethyl-, -dimethoxy- or -diethoxy- or -dichloro-1,1'-diphenyl, 4,4'-diamino-1,1'-diphenyloxide, 4,4'-diamino-1,1'-diphenylsulphide, 4,4'-diamino-1,1'-diphenylmethane, 1,1-di-(4'-aminophenyl)-ethane, 2,2-di-(4'-aminophenyl)-propane, cyclohexyl-, phenyl-, 2-chlorophenyl- or 4-chlorophenyl-di-(4' - aminophenyl) - methane, 1,2-di-(4'-aminophenyl)-ethane, 1,4 - di - (4'-aminophenyl)-butane, 1,6-di-(4'-aminophenyl)-hexane, 1,3- or 1,4-diaminobenzene, 1,3-diamino-4-methyl- or -4-chlorobenzene, 1,4-diamino-2-chlorobenzene, 1,2-diaminoethane, 1,2- or 1,3-diaminopropane, 1,4-diaminobutane, 1,6-diaminohexane, 1,10-diaminodecane, 1,12-diaminododecan, 1,18-diaminooctodecane.

Specially notable compounds of Formula III are, for example, N-methyl-, N-ethyl-, N-isopropyl-, N-phenyl-, N-4-methylphenyl-, N-cyclohexyl-, N-benzyl-N,N-di-(2'-hydroxyethyl)-amine, tris-(2'-hydroxyethyl)-amine, N,N-bis - (2' - hydroxypropyl) - N - 2" - hydroxyethylamine, bis-[4-N,N-di-(2'-hydroxyethyl)- oder -(2'-hydroxypropyl) - aminophenyl] - methane, 1,2-bis-[4'-N,N-di-(2"-hydroxyethyl)- or -(2" - hydroxypropyl)-aminophenyl]-ethane, 1,2-bis-[di-(2'-hydroxyethyl)- or -(2'-hydroxypropyl)-amino]-ethane or -propane, 4,4'-bis-[di-(2"-hydroxyethyl) - amino] - 1,1' - diphenyl, 1,4-bis-[di-(2'-hydroxyethyl)-amino]-benzene, and the adducts of ethylene oxide or propylene oxide on the aforenamed compounds, the sum $a+b+c+d$ being advantageously 4 to 16.

The reaction of phosphonitrilic halides of Formula I with compounds of Formula II or III can be carried out in the presence or absence of solvents or diluents and of catalysts within a wide temperature range.

Only solvents and diluents which are indifferent to the reactants can be considered for this purpose. Preference is given to those which dissolve at least one of the reactants, e.g. preferably aromatic, optionally chlorinated or nitrated hydrocarbons, e.g. those of the benzene series, ethers such as diethyl ether, diisopropyl ether, methylbutyl ether, dioxan, furan, tetrahydrofuran, anisol, phenetol, tertiary amines, such as pyridine, the picolines, quinoline, dimethyl- or diethylaminobenzene, n-methyl- or N-ethyl-piperidine, N-methyl- or N-ethyl-morpholine, amides such as dimethylformamide, dimethylacetamide, tetramethyl-urea, sulphoxides and sulphones such as dimethylsulphoxide and tetramethylenesulphone and the phosphoric acid-tris-(dimethylamide) of formula

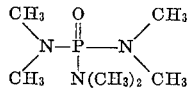

The aforementioned tertiary amines, e.g. pyridine and triethylamine, are suitable catalyst.

The reaction temperature may vary within wide limits, e.g. from $-50°$ to $+200°$ C. At low temperatures the reactivity of the reactants decreases and their solubility is limited. Accordingly the temperature will not generally be lower than about $-20°$ C. in practice and whenever possible the reaction will be conducted at a temperature which can be conveniently maintained, e.g. at $-10°$ C. to 0° C. as the lower limit. At high temperatures the rate of reaction is too rapid to permit effective control of the process, so temperatures in the range of 100° C. to 200° C. will be employed primarily to complete the process when reactants of lower reactivity are involved. By maintaining constant temperature conditions the reaction can be controlled better, which leads to reproducible and more homogeneous final products. A solvent with a boiling point at the reaction temperature can be employed to keep the temperature constant. The preferred temperature range is about $-10°$ to 100° C. or more particularly 0° to 60° C.

It is assumed that the reaction proceeds stepwise with formation or P—O—C— linkages, e.g.

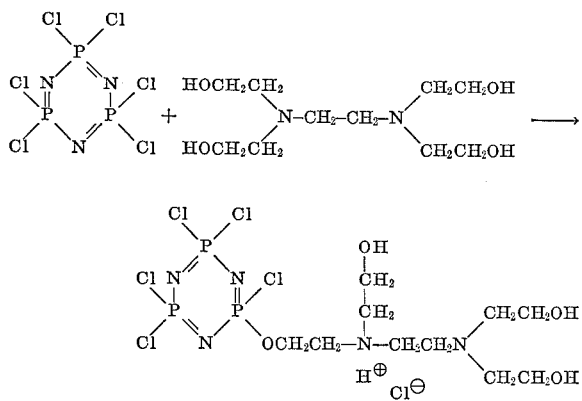

or in the presence of a tertiary base:

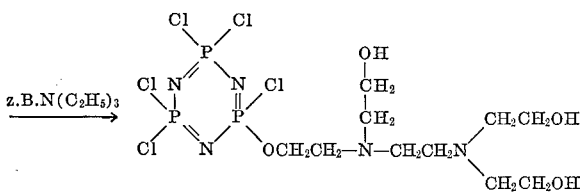

Further rection steps of the same nature give rise to oligomeric and polymeric condensation products.

On completion of the reaction the product is precipitated by dilution with a suitable agent, preferably an alcohol such as methanol, ethanol or isopropanol, or another organic solvent such as acetone or chloroform. It is then filtered off with suction and dried.

Especially valuable products are obtained, when 1 mole of a phosphonitrilic halide and preferably of a phosphonitrilic chloride of the formula $P_mN_mCl_{2m}$ is reacted with 0.75 to 1.5 moles of compounds of Formula II or III. The polymers formed by the reaction of phosphonitrilic halides of Formula I with compounds of Formula II probably contain structural units of formula

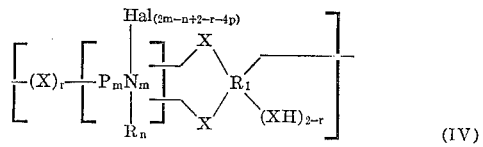

where
$p$ has a value of $m/4$ to $m/2$
$r$ represents 1 or 2,
$r$ represents 1 or 2,
R, X and Hal are bound to phosphorus atoms and
$m$ and $n$ have the aforestated meanings.

By employing the phosphonitrilic halides in excess, products are obtained which owing to their content of free halogen atoms are able to enter into further reactions. The reaction may be prematurely terminated, in which case soluble products are obtained which beside halogen atoms bear hydroxyl or amino groups and hence are capable of further reactions (see Formula Ⓐ below).

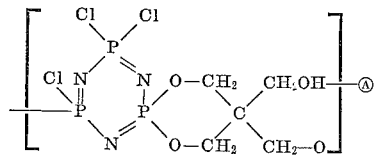

The residual halogen atoms can be reacted with ammonia or with primary or secondary amines. Examples of suitable amines are aliphatic, cycloaliphatic, aromatic and heterocyclic primary or secondary amines such as methylamine, ethylamine, allylamine, dimethylamine, ethyleneimine, aniline, cyclohexylamine, morpholine, and piperidine. The reaction with ammonia can be effected in various ways. The condensation product can be entered into liquid ammonia with stirring. Alternatively it can be suspended in a suitable agent such as water or an alcohol such as methanol or ethanol, or dissolved in an amide such as dimethylformamide, dimethylacetamide or phosphoric acid-tris-(dimethylamide), a sulphoxide, a sulphone, or if the product is water soluble in water, and gaseous ammonia directed through the suspension or solution. Or again the condensation product can be reacted in an alcoholic ammoniacal solution. These modes of the reaction can be carried out within a wide temperature range of $-100°$ to $+100°$ C., or preferably $-33°$ to $+30°$ C.

In a further, subsequent reaction ethylene oxide or propylene oxide can, if desired, be added onto the products reacted with ammonia.

The final products are employed as flame-proofing agents for textile, plastics and synthetic resins.

In the following examples the parts and percentages are by weight; the temperatures are given in degrees centigrade.

EXAMPLE 1

11.6 parts of a mixture of cyclic phosphonitrilic chlorides of the approximate composition 60–70% $(PNCl_2)_3$, 10–15% $(PNCl_2)_4$ and the remainder $(PNCl_2)_{5-12}$ are dissolved in 40 parts of pyridine, with the subsequent addition of 4.53 parts of penta-erythritol. The mixture is stirred for 5 hours, the temperature being maintained at 20° by external cooling at the commencement of the reaction. The mixture is then run into 200 parts of ice-cold methanol with stirring, which precipitates the product. It is filtered off, washed with methanol and dried. The colourless polymer thus formed is soluble at room temperature in dimethyl acetamide, dimethyl formamide, dimethyl sulphoxide, pyridine, dioxan and tetrahydrofuran. It is insoluble in water, alcohols, aliphatic and aromatic hydrocarbons, chlorinated hydrocarbons and acetone. It withstands temperatures up to about 260° without undergoing discoloration, softening or melting. At 25° the product has a solution viscosity of $[\eta]_{sp./c.}=0.0146$ (litre/gram) measured in dimethyl formamide (c.=5 g./litre). It has film-forming properties.

EXAMPLE 2

The procedure detailed in Example 1 is followed, with the difference that the reaction time is extended to 7 hours. The product is isolated in the same way. It is colourless and is insoluble in water and organic solvents, but it swells in dimethyl acetamide, dimethyl formamide, dimethyl sulphoxide, dioxan and tetrahydrofuran. It has film-forming properties. It is resistant at temperatures up to 260°, showing neither decomposition nor softening.

EXAMPLE 3

11.6 parts of trimeric phosphonitrilic chloride $(PNCl_2)_3$ are dissolved in 40 parts of pyridine and 4.53 parts of penta-erythritol are added to the solution. The reaction is conducted as specified in Example 1. The colourless polymer is soluble in the solvents named in Example 1. At 25° it has a solution viscosity of $[\eta]_{sp./c.}=0.019$ (litre/gram) measured in dimethyl formamide (c.=5 g./litre). It possesses film-forming properties.

EXAMPLE 4

31.5 parts of a mixture of cyclic phosphonitrilic chlorides composed approximately of 60–70% $(PNCl_2)_3$, 10–15% $(PNCl_2)_4$ and the remaining percentage $(PNCl_2)_{5-12}$ are dissolved in 50 parts of phosphoric acid-tris-(dimethylamide). A solution of 17.5 parts of tetrakis-(hydroxymethyl)-phosphonium chloride in 60 parts of phosphoric acid-tris-(dimethylamide) is dropped rapidly into the first solution at 20°. The mixture is stirred and 50 parts of pyridine are added at 20°, after which it is maintained at 50–60° for 8 hours. The reaction product is poured into methanol and precipitated with acetone. The colourless polymer thus formed is soluble in dimethyl sulphoxide, alcohols and water, but is insoluble in all the other solvents named in Example 1.

EXAMPLE 5

A solution of 17.4 parts of a mixture of cyclic phosphonitrilic chlorides consisting approximately of 60–70% $(PNCl_2)_3$, 10–15% $(PNCl_2)_4$ and $(PNCl_2)_{5-12}$ as the remainder, is prepared in 100 parts of pyridine. To this solution is added dropwise at 20° with stirring a solution of 10.9 parts of 3,3',4,4'-tetrahydroxy-1,1'-diphenyl in 100 parts of pyridine. The mixture is reacted with stirring for 6 hours at room temperature and the product isolated as stated in Example 1. This polymer is soluble in dimethyl formamide and dimethyl sulphoxide, but is insoluble in water and alcohols. It withstands temperatures up to 280° without undergoing discoloration, softening or melting.

EXAMPLE 6

A solution of 16.2 parts of 4,4-diamino-3,3'-dihydroxy-1,1'-diphenyl in 100 parts of a 1:1 mixture of phosphoric acid-tris-(dimethylamide)/pyridine is added dropwise at 20° with stirring to a solution of 17.4 parts of a mixture of cyclic phosphonitrilic chlorides (as employed in Example 5) in 40 parts of phosphoric acid-tris-(dimethylamine). The mixture is allowed to react for 18 hours at room temperature and then for 9 hours at 50°. The initially brownish solution changes colour to purplish red in the course of the reaction. The product is precipitated with water, filtered off, washed with water and acetone and dried. This polymer has its softening range at 200–210°. It is partially soluble in phosphoric acid-tris-(dimethylamide) and dimethyl sulphoxide, but is insoluble in water and alcohols.

Very similar water insoluble products are obtained when the 4,4'-diamino-3,3'-dihydroxy-1,1'-diphenyl employed in this example is replaced by one of the following: 4,4'-diamino-3,3'-dihydroxy-1,1'-diphenyloxide, 4,4'-diamino - 3,3' - dihydroxy - 1,1' - diphenylsulphone, 3,3'-diamino - 4,4' - dihydroxy - 1,1' - diphenyloxide, 3,3'-diamino - 4,4' - dihydroxy - 1,1' - diphenylsulphone, 3,3'-diamino - 4,4' - dihydroxy - 1,1' - diphenylmethane or 2,2-bis-(3'-amino-4'-hydroxyphenyl)-propane.

EXAMPLE 7

Three parts of gaseous ammonia are conducted slowly into 100 parts of a 10% solution in dimethyl formamide of the polymer produced as described in Example 1. The reaction temperature is maintained at 20–30° by light external cooling. After the ammonia has been added the mixture is held at room temperature for 2 hours and subsequently is diluted 1:1 with methanol. The precipitated reaction product is filtered off with suction, washed with methanol and dried. It is soluble in water and dimethyl sulphoxide but is insoluble in other organic solvents.

EXAMPLE 8

37 parts of a mixture of cyclic phosphonitrilic chlorides consisting approximately of 60—70% $(PNCl_2)_3$, 10–15% $(PNCl_2)_4$ and $(PNCl_2)_{5-12}$ as the remainder are dissolved in 100 parts of dimethyl formamide. With external cooling to keep the temperature at 20° a solution of 25 parts of 1,2 - bis-[di-(2'-hydroxyethyl)-amino]-ethane in 100 parts of dimethyl formamide is added. This is followed, likewise at 20°, by 27 parts of triethylamine. The mixture is reacted for 24 hours at room temperature and after this time it is allowed to stand for 3 days at room temperature. It is then diluted with 200 parts of ethanol to precipitate the product, which is filtered off, washed with alcohol and dried. This polymer is of pale yellowish colour and is soluble in water; it can be precipitated from aqueous solution with ethanol. It is also soluble in dimethyl sulphoxide but is insoluble in alcohols, aliphatic and aromatic hydrocarbons, chlorinated hydrocarbons, ethers, cyclic ethers and acetone. This product is highly hygroscopic.

EXAMPLE 9

A solution of 10 parts of a mixture of cyclic phosphonitrilic chlorides (as specified in Example 8), in 30 parts of dimethyl formamide is combined with a solution of 16 parts of an adduct of 7.2 moles of ethylene oxide on 1 mole of 1,2-bis-[di-(2'-hydroxyethyl)-amino]-ethane in 30 parts of dimethyl formamide under the conditions given in Example 8. Subsequently 7.5 parts of triethylamine are added. The mixture is reacted at room temperature for 24 hours with stirring and is then allowed to stand for 3 days. After this time 100 parts of acetone are added causing the product to settle out. It is filtered off, washed with acetone and dissolved in a little methanol; this solution is filtered and the product precipitated again with acetone. The polymer obtained by this reaction is of pale yellowish colour and dissolves in water, alcohols and chloroform; it is insoluble in ethers, acetone, aromatic and aliphatic hydrocarbons.

Similar products are obtained when the adduct of 7.2 moles of ethylene oxide on 1 mole of 1,2-bis-[di-(2'-hydroxyethyl)-amino]-ethane is replaced by the equivalent amount of the adduct of 4 moles or 12 moles of ethylene oxide on 1 mole of 1,2-bis-[di-(2'-hydroxyethyl)-amino]-ethane or by the equivalent amount of 1,6-bis-[di-(2'-hydroxyethyl)-amino]-hexane or 1,4-bis-[di-(2'-hydroxyethyl)-amino]-butane.

EXAMPLE 10

34.8 parts of a mixture of cyclic phosphonitrilic chlorides (as named in Example 8) are dissolved in 100 parts of dimethyl formamide. Under the conditions given in that example a solution of 15 parts of triethanolamine in 100 parts of dimethyl formamide is added, followed by 20 parts of triethylamine. The mixture is reacted for 16 hours at 20° with stirring. Subsequently methanol is added and the precipitated product filtered off, washed with methanol and dried. The polymer thus formed is well soluble in water.

EXAMPLE 11

50 parts of the reaction product obtained in Example 8 are suspended in 200 parts of ethanol and 10 parts of gaseous ammonia are directed slowly into the suspension at 10–20°. The reaction product is then filtered off, washed with ethanol and dried. It is in the form of a white powder which is well soluble in water and ethylene glycol but is sparingly soluble in other solvents (optionally halogenated hydrocarbons such as benzene, toluene, xylene and chlorobenzene, and in acetone, dimethyl formamide and dimethyl sulphoxide).

EXAMPLE 12

A solution of 11.6 parts of a mixture of cyclic phosphonitrilic chlorides (as in Example 8) in 25 parts of dimethyl formamide is mixed with a solution of 9.6 parts of 1,2 - bis - [di - (2' - hydroxypropyl) - amino] - ethane in 25 parts of dimethyl formamide under the conditions given in Example 8. Subsequently 10 parts of triethylamine are added. The mixture is reacted for 28 hours at room temperature with stirring. The product is precipitated with acetone, filtered off and washed with chloroform. It is readily soluble in water.

EXAMPLE 13

A solution of 11.6 parts of a mixture of cyclic phosphonitrilic chlorides (as in Example 8) in 25 parts of dimethyl formamide is mixed under the conditions given in Example 8 with a solution of 7.5 parts of 1,3-bis-[di-(2'-hydroxyethyl) - amino] - propane in 25 parts of dimethyl formamide, with the subsequent addition of 10 parts of triethylamine. The mixture is stirred for 2 days at room temperature. The product is suspended in chloroform, filtered off and dried. It is well soluble in water.

A similar product is obtained by replacing the 1,3-bis-[di-(2 - hydroxyethyl) - amino] - propane by the same amount of 1,2 - bis -[di - (2' - hydroxyethyl)-amino]-propane.

EXAMPLE 14

A solution of 7 parts of a mixture of cyclic phosphonitrilic chlorides (as in Example 8) in 20 parts of dimethyl formamide is mixed with a solution of 4.7 parts of N,N-bis - (2' - hydroxypropyl) - N - 2'' - hydroxyethylamine in 20 parts of dimethyl formamide under the conditions given in Example 8. After the addition of 8 parts of triethylamine the mixture is stirred for 2 days at room temperature. Subsequently chloroform is added and the product filtered off and dried. It is well soluble in water.

EXAMPLE 15

A solution of 5.8 parts of a mixture of cyclic phosphonitrilic chlorides (as in Example 8) in 10 parts of dimethyl formamide is mixed with a solution of 4.5 parts of N-ethyl-N,N - di - (2'-hydroxyethyl)-amine in 5 parts of dimethyl formamide under the conditions given in that example, with the subsequent addition of 7 parts of triethylamine. The reaction mixture is stirred at room temperature for 2 days, after which the product is precipitated with chloroform and filtered off. It is highly soluble in water. Similar products are obtained when the 4.5 parts of N-ethyl-N,N-di-(2'-hydroxyethyl)-amine are replaced by 4.1 parts of N-methyl - N,N - di - (2' - hydroxyethyl) - amine or 5.0 parts of N-n-propyl- or N-isopropyl-N,N-di-(2'-hydroxyethyl)-amine or 5.5 parts of N-iso-butyl- or N-n-butyl-N, N - di - (2' - hydroxyethyl) - amine or 6.4 parts of N-n-hexyl-N,N-di-(2'-hydroxyethyl)amine.

EXAMPLE 16

A solution of 11.6 parts of a mixture of cyclic phosphonitrilic chlorides (as in Example 8) in 10 parts of dimethyl formamide is mixed with a solution of 12 parts of N-phenyl - N,N - di - (2' - hydroxyethyl) - amine in 15 parts of dimethyl formamide under the conditions of Example 8. After the addition of 14 parts of triethylamine the mixture is reacted for 2 days at room temperature with stirring. The product is precipitated with diethyl ether. It is well soluble in water, alcohols and chloroform. Similar products are produced when instead of N-phenyl-N,N-di-(2'-hydroxyethyl)-amino the following compounds are employed: N - cyclohexyl-, N - 4 - methylcyclohexyl-, N-benzyl-, N - phenylethyl-N-3-methylphenyl-, N-4-methylphenyl-, N-4-methoxyphenyl-, N-2,4-dimethylphenyl-, N-2,5 - dimethylphenyl- or N - 4 - fluorophenyl-N,N-di-(2'-hydroxyethyl)-amine or the adduct of 2 moles of ethylene oxide to N - 3 - chlorophenyl- or N-4-chlorophenyl-N,N-di - (2' - hydroxyethyl) - amine or the adduct of 3 or 4 moles of ethylene oxide to N-4-bromophenyl-N,N-di-(2'-hydroxyethyl)-amine or the adduct of 4 to 8 moles of ethylene oxide to N - 2,5 - dichlorophenyl - N,N - di-(2'-hydroxyethyl)-amine.

By treating the products obtained by the procedures of Examples 12 to 16 with ammonia in accordance with the method described in Example 11, products of good water solubility are formed which are highly suitable for use as flame-proofing agents.

EXAMPLE 17

A 10% aqueous solution of the polymer obtained as described in Example 4 is padded on a cotton cretonne fabric of approximately 125 g./sq. m. weight, the fabric being expressed to contain about 70% of its weight of the solution. The fabric is dried for 10 minutes at 100° and then conditioned in a standard atmosphere for 24 hours. Samples 260 x 95 mm. in size are tested in accordance with German Industrial Standard 53906 (ignition time 6 seconds); the samples are not inflammable and the handle and degree of whiteness of the treated fabric are virtually unaffected by the test.

EXAMPLE 18

A flame-proof finish is applied to cotton cretonne by the method described in Example 17 using a 15% aqueous solution of the polymer obtained as in Example 11. The treated fabric, tested by German Industrial Standard 53906, is not inflammable and undergoes practically no change in handle or whiteness as compared with an untreated fabric. The loss of tensile strength through the treatment is only 14%.

Having thus disclosed the invention what we claim is:

1. Polymers containing phosphorus and nitrogen, obtained by reacting 1 mole of a phosphonitrilic halide of formula $$(P_m N_m Hal_{2m})$$

wherein each Hal is chlorine, bromine or fluorine and is directly bound to a phosphorus atom, and
$m$ is one of the integers 3 to 12, with 0.75 to 1.5 moles of compounds of the formulae

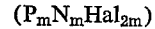

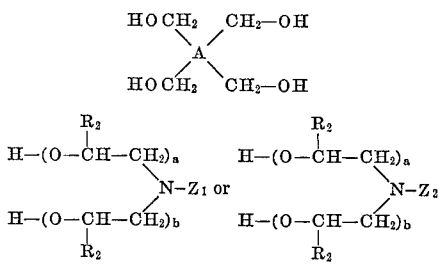

wherein

A is

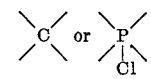

$Z_1$ is alkyl with 1 to 6 carbon atoms, phenyl-lower alkyl, cyclohexyl, methylcyclohexyl, or aryl of the benzene series bearing optionally 1 to 2 substituents of the group consisting of lower alkyl, lower alkoxy, fluoro, bromo and chloro, $Z_2$ is

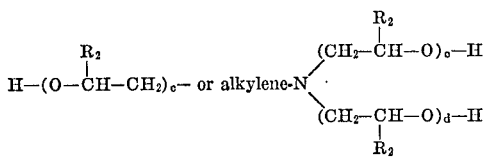

alkylene contains 2 to 6 carbon atoms, $R_2$ is hydrogen or lower alkyl and each of $a$, $b$, $c$ and $d$ is one of the integers 1, 2, 3 or 4.

2. Polymers containing phosphorus and nitrogen according to claim 1, wherein the phosphonitrilic halide employed is phosphonitrilic chloride.

3. Polymers containing phosphorus and nitrogen according to claim 1, wherein 1 mole of phosphonitrilic chloride of the formula $$(P_mN_mCl_{2m})$$

wherein $m$ is an integer from 3 to 12, is reacted with 1 mole of compounds of the formulae

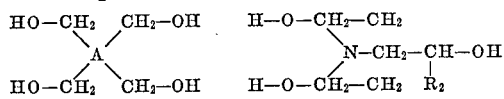

or

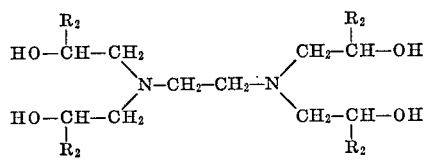

wherein A is

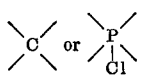

and $R_2$ is hydrogen or methyl.

4. The polymer containing phosphorus and nitrogen according to claim 1, obtained by reacting 1 mole of phosphonitrilic chloride of the formula $$(P_mN_mCl_{2m})$$

wherein $m$ is an integer from 3 to 12, with 1 mole of pentaerythritol.

5. The polymer containing phosphorus and nitrogen according to claim 1, obtained by reacting 1 mole of phosphonitrilic chloride of the formula $$(P_mN_mCl_{2m})$$

wherein $m$ is an integer from 3 to 12, with 1 mole of tetrakis-(hydroxymethyl)-phosphonium chloride.

6. The polymer containing phosphorus and nitrogen according to claim 1, obtained by reacting 1 mole of phosphonitrilic chloride of the formula $$(P_mN_mCl_{2m})$$

wherein $m$ is an integer from 3 to 12, with 1 mole of triethanolamine.

7. The polymer containing phosphorus and nitrogen according to claim 1, obtained by reacting 1 mole of phosphonitrilic chloride of the formula $$(P_mN_mCl_{2m})$$

wherein $m$ is an integer from 3 to 12, with 1 mole of 1,2-bis-[di-(2'-hydroxyethyl)-amino]-ethane.

8. The polymer containing phosphorus and nitrogen according to claim 1, obtained by reacting 1 mole of phosphonitrilic chloride of the formula $$(P_mN_mCl_{2m})$$

wherein $m$ is an integer from 3 to 12, with 1 mole of 1,2-bis-[di-(2'-hydroxypropyl)-amino]-ethane.

References Cited

UNITED STATES PATENTS

| | | | |
|---|---|---|---|
| 2,866,773 | 12/1958 | Redfarn | 260—47 |
| 3,344,087 | 9/1967 | Becke et al. | 260—2 |
| 3,412,045 | 11/1968 | Bloom | 260—2 |

FOREIGN PATENTS

| | | | |
|---|---|---|---|
| 788,785 | 1/1958 | Great Britain | 260—2 |

OTHER REFERENCES

Garner et al.: "Phosphonitrilic Polymers Stable at High Temperatures," Report No. AD 608982.

SAMUEL H. BLECH, primary Examiner

U.S. Cl. X.R.

117—143; 260—29.2, 30.2, 30.4, 30.6, 30.8, 32.6, 33.2, 33.4, 33.6, 33.8, 47, 49, 63, 79, Flameproof digest